United States Patent [19]

Shimizu et al.

[11] 4,431,557

[45] Feb. 14, 1984

[54] REFRIGERATOR OIL COMPOSITION(S)

[75] Inventors: Isao Shimizu; Yasuo Kondo, both of Yokohama; Koji Beppu, Kawasaki, all of Japan

[73] Assignee: Mitsubishi Oil Company, Ltd., Tokyo, Japan

[21] Appl. No.: 332,779

[22] Filed: Dec. 21, 1981

[51] Int. Cl.³ .............................................. C10M 3/14
[52] U.S. Cl. .................................. 252/52 A; 252/67; 252/68
[58] Field of Search ......................... 252/52 A, 67, 68

[56] References Cited

U.S. PATENT DOCUMENTS 2,523,863  9/1950  Cook et al. .................... 252/68
2,552,084  5/1951  Bishop et al. .................. 252/68
4,248,726  2/1981  Uchinama et al. ............. 252/52 A Primary Examiner—Jacqueline V. Howard
Attorney, Agent, or Firm—Sughrue, Mion, Zinn, Macpeak, and Seas

[57] ABSTRACT

A fluid composition comprised of a fluorocarbon refrigerant, a hydrocarbon oil, and an alkylene oxide additive compound represented by the general formula (I):

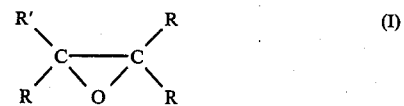

wherein R is hydrogen or a lower alkyl group and R' is an alkyl group, wherein R and R' contain 6 or more carbon atoms. The additive improves the thermal resistance of the oil in the presence of the refrigerant.

9 Claims, No Drawings

REFRIGERATOR OIL COMPOSITION(S)

FIELD OF THE INVENTION

The present invention relates to refrigerator oil compositions. In general detail, the present invention relates to refrigerator oil compositions having an excellent thermal resistance property as a lubricating oil for compression type refrigerators using fluorocarbon refrigerants.

BACKGROUND OF THE INVENTION

In recent years, refrigerators have been broadly utilized not only for various kinds of freezers and air conditioners but also for cooling systems and temperature control devices of industrial instruments and machines. Various refrigerators having a suitable size or a suitable structure have been developed. Generally, fluorocarbon refrigerants are used as a refrigerant in compression type refrigerators such as reciprocating, turbo and rotary type ones.

Lubricating oils used for these compression type refrigerators must have excellent thermal resistance as well as characteristics such as lubricating property, miscibility with fluorocarbon refrigerants, etc. Particularly, in recent years, it has become more and more necessary to use refrigerator oils having good stability, since the operating temperature of refrigerators rises for the reason that the design of refrigerators has been directed toward small-sized ones. Further, characteristics required for refrigerator oils are diversified. For example, low viscosity oils are required for reducing the fluid friction, while high viscosity oils are required for improving lubrication and sealing of the high temperature parts of small-sized refrigerators having high performance and rotary type refrigerators. Further, it is necessary to use refrigerator oils having non-toxic and non-hazardous properties in order to protect workers in factories and refrigerator repair workshops, because the refrigerator oil sometimes comes in contact with the workers when filling refrigerators with the refrigerator oil.

It has been known that fluorocarbon refrigerants such as R-11 (JIS K1520, trichloromonofluoromethane), R-12 (JIS K1517, dichlorodifluoromethane), R-22 (JIS K1519, monochlorodifluoromethane) and R-113 (JIS K1528, trichlorotrifluoroethane), etc., generally have high individual thermal stability. However, the degree of stability varies among them. For example, R-14 (tetrafluoromethane) is the stablest and does not undergo any decomposition even if heated to 400° C. for 500 hours. R-11 is the least stable and does not decompose at less than 200° C. and only 2.5% thereof decomposes at 200° C. after 1 year. Refrigerator oils generally have high thermal stability in their pure form, in air, or in an inert atmosphere. Although the degree of stability varies among different refrigerator oils, the decomposition temperature is generally more than 300° C. However, if the fluorocarbon refrigerant and the oil are present together, they are chemically activated. Further, when they are subjected to a catalytic function of metal and influenced by contaminants such as air or water, etc., they undergo decomposition or reactions at lower temperatures. Consequently they cause corrosion of metal and formation of sludges. Furthermore, the formed carbonaceous deposits or sludges sometimes cause troubles such as lowering of compression efficiency and seizure (*ASHRE JOURNAL*, August 1962, page 59 and *ASHRE JOURNAL*, November 1967, page 54).

Mineral oil type refrigerator oils contain active compounds in a very small amounts. These active compounds include sulfur compounds, nitrogen compounds and oxygen compounds which readily react with fluorocarbon refrigerant. These active compounds are removed by refining to improve thermal resistance. Generally known refining processes include solvent extraction, hydrogenation, treatment with sulfuric acid, treatment with clay and dehydrating treatment. A combination of these processes are generally carried out. Synthetic oils are generally treated with clay or dehydrating treatment in order to remove the impurities.

In order to satisfy various characteristics required for the refrigerator oil, various kinds of base oils must be utilized. However, some kinds of oil cannot be economically refined. Accordingly, additives may be effectively utilized in some instances.

SUMMARY OF THE INVENTION

The present invention provides additives for improving the thermal resistance of refrigerator oil in the presence of fluorocarbon refrigerant. The present invention relates to refrigerator oil compositions which are prepared by adding an alkylene oxide compound represented by the general formula (I) to (1) at least one of a mineral or synthetic oil or to (2) said oil (1) containing additional ingredients such as an antioxidant, a load carrying additive, a rust inhibitor, and a corrosion inhibitor. The alkylene oxide has the general formula (I):

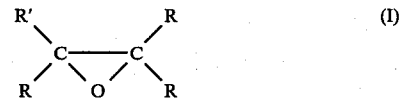

wherein R represents a hydrogen atom or a lower alkyl group, and R' represents an alkyl group, wherein R and R' contain 6 or more carbon atoms.

DETAILED DESCRIPTION OF THE INVENTION

Lower alkylene oxides such as propylene oxide or butylene oxide, etc., have been known as stabilizers for chlorinated lower hydrocarbon solvents or as corrosion inhibitors for metals, for example, as described in Japanese Patent Application (OPI) No. 117407/79 (the term "OPI" as used herein refers to a "published unexamined Japanese patent application"), and they have been generally used. However, alkylene oxide compounds have not been utilized in connection with refrigerator oil.

The present inventors have studied various additives for improving the thermal resistance of refrigerator oil in the presence of fluorocarbon refrigerants as well as removal of active components in the oil. As a result, it has been found that the stability of refrigerator oils to the fluorocarbon refrigerant is improved by addition of alkylene oxide compounds. The degree of the effect depends on the composition of the oil and the degree of refinement. Futhermore, the inventors have found that the addition of alkylene oxide compounds is effective for oils having a low degree of refinement.

The alkylene oxide compounds can be obtained by oxidizing α-olefin produced by an ethylene polymerization process (U.S. Pat. No. 2,889,385) or a wax decomposition process (U.S. Pat. No. 2,945,076), etc., by a chlorohydrin process (U.S. Pat. No. 2,615,901) or by a direct oxidation process (U.S. Pat. No. 2,752,363) using an oxidizing agent. Furthermore, alkylene oxide compounds which are available in the market can be used.

Among alkylene oxide compounds represented by the general formula (I) in the present invention, propylene oxide (U.S. Pat. No. 3,026,333) and butylene oxide (U.S. Pat. No. 2,741,623) are not suitable because of their low boiling point. Preferred additives for the mineral oils or synthetic oils or for lubricant oils containing antioxidant, load carrying additive, rust inhibitor, corrosion inhibitor, etc., include alkylene oxide compounds having 6 or more carbon atoms and, preferably, $C_8$–$C_{18}$ α-olefin oxides. Further, one or more alkylene oxide compounds may be mixed. The alkylene oxide compounds used in the present invention are added in a total amount of 0.01 to 10% by weight and, preferably, 0.5 to 3% by weight, based on the weight of the oil. Oils are chosen which have particular characteristics depending on their purpose. Though oils having a high degree of refinement are preferred, oils having a low degree of refinement may be used. The viscosity and composition of the oils are not restricted. Examples of useful mineral oils include paraffinic and naphthenic oils (U.S. Pat. No. 3,791,959 and *Lubrication Engineering,* September 1947, page 9). Examples of synthetic oils include alkylbenzene, alkylnaphthalene, isoparaffin, α-olefin, olefin polymers such as polybutene, etc., isobutyleneolefin copolymers, ethylene-olefin copolymers, dibasic acid esters, pentaerythritol esters, polyoxyalkylene glycol and derivatives thereof (U.S. Pat. No. 3,791,959, *ASHRE Symposium,* Nassau, June 29, 1972 and *ASHRE Semiannual Meeting,* Chicago II, June 28, 1973), which have been known as lubricating oils and can be applied alone or as a mixture with mineral oils or other synthetic oils. Examples of additives used together with them include any number of materials which are effective for the refrigerator oils, and known additives can be used. For example, it is possible to use antioxidants such as hindered phenols, or phenyleneamines, etc., load carrying additives such as phosphorous acid esters, phosphoric acid esters, thiophosphoric acid esters, organic sulfur compouns or organic halogen compounds, etc., and rust inhibitor or corrosion inhibitors such as amines, acid esters or benzotriazoles, etc.

Examples of the fluorocarbon refrigerants used in the present invention preferably include substance selected from the group consisting of R-11 (trichloromonofluoromethane: $CCl_3F$), R-12 (dichlorodifluoromethane: $CCl_2F_2$), R-13 (monochlorotrifluoromethane: $CClF_3$), R-21 (dichloromonofluoroethane: $CHCl_2F$), R-22 (monochlorodifluoromethane: $CHClF_2$), R-113 (trichlorotrifluoroethane: $CCl_2\text{-}CClF_2$), R-114 (dichlorotetrafluoroethane: $CClF_2\text{-}CClF_2$), R-500 (dichlorodifluoromethane+difluoroethane: $CCl_2F_2+CH_3\text{-}CHF_2$) and R-502 (monochlorodifluoromethane+monochloropentafluoroethane: $CHClF_2+CClF_2.CF_3$).

Oral toxicity of the alkylene oxide compounds having 6 or more carbon atoms represented by the general formula (I) in the present invention is $LD_{50}$ (mouse orally dosed) 20 ml/kg or more, which is regarded as non-toxic according to FHSLA (Federal Hazardous Substance Labelling Act) in the U.S.A. Further, when the amount of the alkylene oxide compounds having 6 or more carbon atoms in the present invention is 10% or less, the FHSLA in the U.S.A. indicates that skin irritation does not occur. For example, the primary skin irritation rating of white rabbits is less than 2.9 when adding a mixture of $C_{12}$ and $C_{14}$-α-olefin oxides. Accordingly, the addition of the alkylene oxide compounds in the present invention does not have a bad influence upon toxicity and skin irritation. Consequently they can be used free from fear of such hazards.

In case of other oxide compounds, epoxide compounds produced from vegetable oils as a raw material have low toxicity. For example, epoxy soybean oil has $LD_{50}$ (mouse orally dosed) more than 20 ml/kg and is used as a stabilizer for vinyl chloride. However, they have a tendency to forming sludges by separating from the oil in the presence of the fluorocarbon refrigerant.

Further, styrene oxide (U.S. Pat. No. 2,776,982) and phenyl glycidyl ether (U.S. Pat. No. 2,665,254) used as a stabilizer for chlorine containing organic compounds have high toxicity of $LD_{50}$ (mouse orally dosed) 2.83 ml/kg and 4.26 ml/kg, respectively, and they cause remarkably fierce skin irritation. For example, the phenyl glycidyl ether causes inflammation due to contact even if it is diluted with 10 times the amount of non-toxic base oil. Therefore, it is not preferred in the viewpoint of hazard.

Since it becomes possible to improve the thermal resistance property of mineral or synthetic oils to fluorocarbon refrigerant by addition of the alkylene oxide compounds, the present invention is useful for improving the quality of prior refrigerator oils. Furthermore, it extends the application of the base oil for the refrigerator oils. For example, mineral oils having a low degree of refinement or synthetic oils having good characteristics but poor stability to the fluorocarbon refrigerant can be effectively utilized as the refrigerator oil. Moreover, the alkylene oxide compounds having 6 or more carbon atoms can be safely used, because they have low toxicity and show low skin irritation.

In the following, the present invention will be illustrated in greater detail with reference to examples.

EXAMPLE A

Four kinds of mineral base oils each having a different degree of refinement and four kinds of synthetic oils each having a different composition were prepared. A mixture of $C_{12}$-α-olefin oxide and $C_{14}$-α-olefin oxide was added to them to produce compositions of the present invention. The thermal resistance of the compositions to R-12 refrigerant was compared by a sealed glass tube test.

TABLE 1

Results of Test for Thermal Resistance Property of Refrigerator Oil Compositions (Examples of the Present Invention)

| | Refrigerator Oil Composition | | % by Weight | Results of Sealed Glass Tube Test (days required for forming sludges) | | |
|---|---|---|---|---|---|---|
| | Base Oil | Additive | | @ 150° C. | @ 175° C. | @ 200° C. |
| Example 1 | Mineral oil A | $C_{12}/C_{14}$—α-olefin oxide* | 1.5 | more than 15 days | 12 days | 4 days |
| Example 2 | Mineral oil B | " | 1.5 | more than 15 days | more than 15 days | 12 days |

TABLE 1-continued

Results of Test for Thermal Resistance Property of Refrigerator Oil Compositions (Examples of the Present Invention)

| | Refrigerator Oil Composition | | | Results of Sealed Glass Tube Test (days required for forming sludges) | | |
|---|---|---|---|---|---|---|
| | Base Oil | Additive | % by Weight | @ 150° C. | @ 175° C. | @ 200° C. |
| Example 3 | Mineral oil C | " | 1.5 | more than 15 days | more than 15 days | 10 days |
| Example 4 | Mineral oil D | " | 1.5 | more than 15 days | more than 15 days | 6 days |
| Example 5 | Alkylbenzene oil | " | 1.5 | more than 15 days | more than 15 days | more than 15 days |
| Example 6 | Dibasic acid ester oil | " | 1.5 | more than 15 days | more than 15 days | 4 days |
| Example 7 | Polyglycol oil | " | 1.5 | more than 15 days | more than 15 days | 2 days |
| Example 8 | Polybutene oil | " | 1.5 | more than 15 days | more than 15 days | 14 days |

*Mixture of $C_{12}$—α-olefin oxide and $C_{14}$—α-olefin oxide

TABLE 2

Results of Test for Thermal Resistance Property of Refrigerrator Oil Compositions (Comparative Examples)

| | Refrigerator Oil Composition | | Viscosity cSt (mm²/s) | | Viscosity Index | Sulfur Content (% by weight) | Results of Sealed Glass Tube Test (days required for forming sludges) | | |
|---|---|---|---|---|---|---|---|---|---|
| | Base Oil | Additive | @ 40° C. | @ 100° C. | | | @ 150° C. | @ 175° C. | @ 200° C. |
| Comparative Example 1 | Mineral oil A | None | 23.5 | 3.7 | −28 | 2.0 | 15 days | 5 days | 2 days |
| Comparative Example 2 | Mineral oil B | " | 21.7 | 3.6 | 0 | 0.8 | more than 15 days | 15 days | 5 days |
| Comparative Example 3 | Mineral oil C | " | 96.4 | 10.9 | 97 | 0.2 | more than 15 days | more than 15 days | 6 days |
| Comparative Example 4 | Mineral oil D | " | 454 | 31.0 | 98 | 0.4 | more than 15 days | 7 days | 4 days |
| Comparative Example 5 | Alkylbenzene oil | " | 22.9 | 4.2 | 80 | 0.0 | more than 15 days | more than 15 days | 8 days |
| Comparative Example 6 | Dibasic acid ester oil | " | 23.1 | 4.2 | 70 | 0.0 | 12 days | 6 days | 2 days |
| Comparative Example 7 | Polyglycol | " | 42.0 | 245 | 227 | 0.0 | 7 days | 3 days | 1 day |
| Comparative Example 8 | Polybutene oil | " | 112 | 10.6 | 56 | 0.0 | more than 15 days | more than 15 days | 7 days |

TABLE 3

Results of Test Thermal Resistance Property of Refrigerator Oil Compositions (Comparative Examples)

| | Refrigerator Oil Composition | | | Results of Sealed Glass Tube Test (days required for forming sludges) | | |
|---|---|---|---|---|---|---|
| | Base Oil | Additive | % by Weight | @ 150° C. | @ 175° C. | @ 200° C. |
| Comparative Example 9 | Mineral oil A | Epoxy soybean oil | 1.5 | more than 15 days | 10 days | 2 days |
| Comparative Example 10 | Polyglycol oil | " | 1.5 | more than 15 days | 12 days | 1 day |

(Note)
1. Viscosity was measured by ASTM D 445 (Standard Test Method for KINEMATIC VISCOSITY OF TRASNPARENT AND OPAQUE LIQUIDS (AND THE CALCULATION OF DYNAMIC VISCOSITY)).
2. Viscosity index was measured by ASTM D 2270 (Standard Method for CALCULATING VISCOSITY INDEX FROM KINEMATIC VISCOSITY AT 40 AND 100° C.)
3. Sulfur content was measured by ASTM D 129 (Standard Test Method for SULFUR IN PETROLEUM PRODUCTS (GENERAL BOMB METHOD)).
4. The sealed glass tube test was carried out by enclosing equal amounts of oil and R-12 refrigerant in a glass test tube together with aluminum, iron and copper as a catalyst and testing at a temperature of 150° C., 175° C. or 200° C. for 15 days, and the result was evaluated based on the number of days required for forming sludges.

Comparative Example 1 uses unrefined oil, Comparative Example 2 uses oil treated with sulfuric acid and clay, Comparative Examples 3 and 4 use oils refined by solvent extraction or by hydrogenation, Comparative Examples 5 to 8 use synthetic oils available in the market, and Comparative Examples 9 and 10 use oils of Comparative Examples 1 and 7 and further include epoxy soybean oil.

Examples 1 to 8 use oils of Comparative Examples 1 to 8 to which $C_{12}/C_{14}$-α-olefin oxides were added.

Some base oils show high thermal stability because of the refinement effect or the composition thereof. However, the time (the number of days) to formation of sludges is plolonged about 2 to 2.5 times by addition of $C_{12}/C_{14}$-α-olefin oxides as shown in Examples.

Particularly, Examples 1 and 7 show that the stability to the fluorocarbon refrigerant is remarkably poor when not adding the additive but nearly the same thermal stability as that of other base oils can be obtained by addition of the additive.

Further, in Comparative Examples 9 and 10, the sludges have a tendency to adhere to the upper inside wall of the test tube by separation of the additive or reaction products, which means that the thermal stability of epoxy soybean oil itself is poor. On the contrary, in Examples 1 and 7 wherein $C_{12}/C_{14}$-α-olefin oxides were added, adhesion of sludges to the inside wall of the test tube was not observed and the thermal stability thereof is excellent, which means that the additive shows a more excellent effect.

EXAMPLE B

A mixture of $C_{12}$-α-olefin oxide and $C_{14}$-α-olefin oxide was added to a refined mineral oil or a polyglycol as the base oil to prepare compositions of the present invention, and skin irritation of them was compared by a test for primary skin irritation of rabbits.

TABLE 4

Results of Test for Primary Skin Irritation Property of Refrigerator Oil Composition (Examples of the Present Invention)

| | Refrigerator Oil Composition | | Primary Skin Irritation Rating |
|---|---|---|---|
| | Base Oil | Additive | % by Weight | |
| Example 9 | Refined mineral oil | $C_{12}/C_{14}$—α-olefin oxide* | 1.0 | 0.52 |
| Example 10 | Refined mineral oil | $C_{12}/C_{14}$—α-olefin oxide* | 10.0 | 2.5 |
| Example 11 | Polyglycol | $C_{12}/C_{14}$—α-olefin oxide* | 1.0 | 0.68 |
| Example 12 | Poylglycol | $C_{12}/C_{14}$—α-olefin oxide* | 10.0 | 2.9 |

*Mixture of $C_{12}$—α-olefin oxide and $C_{14}$—α-olefin oxide.

TABLE 5

Results of Test for Primary Skin Irritation Property of Refrigerator Oil Composition (Comparative Examples)

| | Refrigerator Oil Composition | | | Primary Skin Irritation Rating |
|---|---|---|---|---|
| | Base Oil | Additive | % by Weight | |
| Comparative Example 11 | Refined mineral oil | None | | 0.52 |
| Comparative Example 12 | Refined mineral oil | Phenyl glycidyl ether | 1.0 | 3.2 |
| Comparative Example 13 | Refined mineral oil | Phenyl glycidyl ether | 10.0 | 7.7 |
| Comparative Example 14 | Polyglycol | None | | 0.68 |
| Comparative Example 15 | Polyglycol | Phenyl glycidyl ether | 1.0 | 3.0 |
| Comparative Example 16 | Polyglycol | Phenyl glycidyl ether | 10.0 | 7.6 |

(Note)
Method of measuring primary skin irritation rating:
Measurement was carried out according to a Federal Register Method with using six white rabbits [Federal Register: Hazardous Substances. Proposed revision of test for primary skin irritants. 37 (244); 27635-27636, 1972.]
[0.5 ml of the sample to be tested was applied to lint. After the lint was brought into contact with the dehaired skin of white rabbit for 4 hours, the primary skin irritation rating was determined on the basis of a standard which was obtained by observing the degree of erythema and edema produced after 2, 24 and 48 hours (0: no erythema and no edema to 8: severe erythema and severe edema).]

Comparative Example 11 uses refined mineral oil, and Comparative Examples 12 and 13 are cases of adding phenyl glycidyl ether as another oxide compound in the amount of 1.0% by weight and 10.0% by weight, respectively. Likewise, Comparative Example 14 uses polyglycol oil, and Comparative Examples 15 and 16 are cases of adding phenyl glycidyl ether in the amount of 1.0% by weight and 10.0% by weight, respectively.

Examples 9 and 10 use refined mineral oil and Examples 11 and 12 use polyglycol oil as the base oil, wherein $C_{12}/C_{14}$-α-olefin oxides are added in an amount of 1.0% by weight and 10.0% by weight, respectively.

Comparative Examples 12, 13, 15 and 16 show that the skin irritation becomes remarkably serious by addition of phenyl glycidyl ether. The skin remains reddish and swollen for 48 hours or more after contact with the oil containing 10% by weight of phenyl glycidyl ether.

In Examples 9 to 12, the skin irritation rating of the oil containing 1% by weight of $C_{12}/C_{14}$-α-olefin oxides is not different from that of the base oil, and that of the oil containing 10% by weight thereof is less than 2.9 which is judged as no skin irritation according to FHSLA in the U.S.A.

It is recognized by Examples A and B that the alkylene oxide containing oil of the present invention has excellent thermal resistance property to fluorocarbon refrigerant and has a less influence upon the human bodies, namely, it has characteristics which were not observed in other additive oils in the viewpoint of quality and hazard. Consequently, it may be added to various kinds of oils in order to improve the quality thereof.

While the invention has been described in detail and with reference to specific embodiments thereof, it will be apparent to one skilled in the art that various changes and modifications can be made therein without departing from the spirit and scope thereof.

What is claimed is:

1. A refrigerator oil composition, comprising:
   at least one oil selected from the group consisting of mineral oils and synthetic oils; and
   an alkylene oxide additive compound represented by the general formula (I):

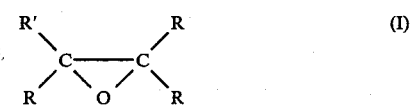

wherein R is hydrogen or a lower alkyl group, and R' is an alkyl group, wherein R and R' contain 6 or more carbon atoms.

2. A refrigerator oil composition as claimed in claim 1, wherein said alkylene oxide additive is contained in an amount of 0.01 to 10% by weight based on the weight of said oil.

3. A refrigerator oil composition as claimed in claim 1, wherein said oil contains additional conventional additives.

4. A refrigerator oil composition as claimed in claim 1, wherein said alkylene oxide additive compound is an α-olefin oxide containing from 8 carbon atoms to 18 carbon atoms.

5. A refrigerator oil composition as claimed in claim 4, wherein said α-olefin oxide compound is contained in an amount of 0.5% to 3% by weight based on the weight of said oil.

6. A fluid composition, comprising:
a fluorocarbon refrigerant;
at least one oil selected from the group consisting of a mineral oil and a synthetic oil; and
an alkylene oxide additive compound represented by the general formula (I):

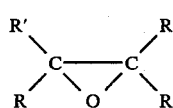

wherein R is hydrogen or a lower alkyl group and R' is an alkyl group, wherein R and R' contain 6 or more carbon atoms.

7. A fluid composition as claimed in claim 6, wherein said alkylene oxide compound is an α-olefin oxide containing from 8 carbon atoms to 18 carbon atoms and is contained within said oil in an amount of 0.01% to 10% by weight based on the weight of said oil.

8. A fluid composition as claimed in claim 7, wherein said α-olefin oxide additive is contained in an amount of 0.5% to 3% by weight based on the weight of said oil.

9. A fluid composition as claimed in claim 8, wherein said fluorocarbon refrigerant is selected from the group consisting of trichloromonofluoromethane, dichlorodifluoromethane, monochlorotrifluorotrifluoromethane, dichloromonofluorethane, trichlorotrifluoroethane, dichlorotetrafluoroethane, dichlorodifluoromethane+difluoroethane and monochlorodifluoromethane+monochloropentafluoroethane.

* * * * *